United States Patent
Liu (10) Patent No.: US 9,541,683 B2
(45) Date of Patent: Jan. 10, 2017

(54) CURVED REFLECTIVE MIRROR AND MANUFACTURING METHOD THEREOF

(75) Inventor: Yang Liu, Beijing (CN)

(73) Assignee: TERASOLAR PHOTOTHERMAL TECHNOLOGY CO., LTD., Beijing (CN)

(*) Notice: Subject to any disclaimer, the term of this patent is extended or adjusted under 35 U.S.C. 154(b) by 195 days.

(21) Appl. No.: 13/995,029

(22) PCT Filed: Oct. 12, 2011

(86) PCT No.: PCT/CN2011/080704
§ 371 (c)(1),
(2), (4) Date: Jun. 17, 2013

(87) PCT Pub. No.: WO2012/079416
PCT Pub. Date: Jun. 21, 2012

(65) Prior Publication Data
US 2013/0265667 A1  Oct. 10, 2013

(30) Foreign Application Priority Data

Dec. 17, 2010 (CN) .......................... 2010 1 0594506
Dec. 24, 2010 (CN) .......................... 2010 1 0606339

(51) Int. Cl.
*G02B 5/10* (2006.01)
*B32B 17/10* (2006.01)
(Continued)

(52) U.S. Cl.
CPC ............ *G02B 5/10* (2013.01); *B32B 17/1022* (2013.01); *B32B 17/10036* (2013.01);
(Continued)

(58) Field of Classification Search
CPC .......... Y02E 10/40; Y02E 10/42; Y02E 10/45; G02B 5/08; G02B 5/09; G02B 5/10
(Continued)

(56) References Cited

U.S. PATENT DOCUMENTS 4,124,277 A    11/1978  Stang
4,372,027 A *  2/1983   Hutchison ........................ 29/448
(Continued)

FOREIGN PATENT DOCUMENTS

CN        2305622 Y       1/1999
CN      101389909 A       3/2009
(Continued)

OTHER PUBLICATIONS

International Search Report (PCT/ISA/210) issued on Jan. 19, 2012, by the Chinese Patent Office as the International Searching Authority for International Application No. PCT/CN2011/080704.
(Continued)

*Primary Examiner* — Darryl J Collins
*Assistant Examiner* — Robert E Tallman
(74) *Attorney, Agent, or Firm* — Buchanan Ingersoll & Rooney PC (57) ABSTRACT

A curved reflective mirror includes a flat glass structure, an intermediate adhesive layer, and a flat glass mirror. The intermediate adhesive layer is positioned between the flat glass structure and the flat glass mirror. The flat glass structure, the intermediate adhesive layer, and the flat glass mirror are curved and deformed in a mechanical manner with the support of a mold. The curved and deformed flat glass structure, intermediate adhesive layer, and flat glass mirror are solidified and bonded together in a heating and/or ultraviolet (UV) light radiation and/or room temperature solidification manner to form a composite curved structure. Also provided is a method for manufacturing a curved reflective mirror. The curved reflective mirror can be widely applied in the fields of solar thermal collection and concentration and solar thermal power generation.

31 Claims, 5 Drawing Sheets

(51) Int. Cl.
*C03C 27/10* (2006.01)
*B32B 38/00* (2006.01)
*F24J 2/10* (2006.01)
*F24J 2/14* (2006.01)
*F24J 2/46* (2006.01)

(52) U.S. Cl.
CPC .. *B32B 17/10706* (2013.01); *B32B 17/10761* (2013.01); *B32B 17/10788* (2013.01); *B32B 38/0012* (2013.01); *C03C 27/10* (2013.01); *F24J 2/1057* (2013.01); *F24J 2/14* (2013.01); *F24J 2002/4676* (2013.01); *Y02E 10/45* (2013.01); *Y02E 10/52* (2013.01); *Y10T 156/1048* (2015.01)

(58) Field of Classification Search
USPC .......... 359/838, 846–849, 850–853, 867, 359/871–877, 883, 884
See application file for complete search history.

(56) References Cited

U.S. PATENT DOCUMENTS

| | | | |
|---|---|---|---|
| 4,451,119 A | | 5/1984 | Meyers et al. |
| 5,069,540 A | * | 12/1991 | Gonder .......... 359/853 |
| 2007/0291384 A1 | * | 12/2007 | Wang ............ 359/883 |
| 2009/0027792 A1 | | 1/2009 | Dreyer et al. |
| 2012/0087029 A1 | * | 4/2012 | Vandal et al. ....... 359/883 |

FOREIGN PATENT DOCUMENTS

| | | |
|---|---|---|
| CN | 201255776 Y | 6/2009 |
| CN | 201311497 Y | 9/2009 |
| CN | 101571605 A | 11/2009 |
| CN | 101614448 A | 12/2009 |
| CN | 101661125 A | 3/2010 |
| CN | 201945704 U | 8/2011 |
| CN | 202025101 U | 11/2011 |
| CN | 202075436 U | 12/2011 |

OTHER PUBLICATIONS

Office Action issued on Apr. 12, 2013, by the Chinese Patent Office in corresponding Chinese Patent Application No. 201010606339.8. (10 pages).
Office Action issued on Nov. 11, 2013, by the Chinese Patent Office in corresponding Chinese Patent Application No. 201010606339.8. (10 pages).
Office Action issued on Feb. 27, 2014, by the Chinese Patent Office in corresponding Chinese Patent Application No. 201010606339.8. (3 pages).
Office Action issued on Apr. 3, 2014, by the Chinese Patent Office in corresponding Chinese Patent Application No. 201010606339.8. (4 pages).
Office Action issued on Apr. 30, 2014, by the Australian Patent Office in corresponding Australian Patent Application No. 2011345019. (2 pages).
Office Action issued on Oct. 24, 2014, by the Canadian Patent Office in corresponding Canadian Patent Application No. 2,821,205. (3 pages).

* cited by examiner

CURVED REFLECTIVE MIRROR AND MANUFACTURING METHOD THEREOF

BACKGROUND

Technical Field

The present invention relates to the field of glasswork and processing, and in particular, to a curved reflective mirror applied in the field of solar energy and a manufacturing method thereof.

Related Art

At present, in many industrial apparatuses, especially in a solar energy light concentrating system, various light concentrating reflective mirrors of different shapes are often used. The light concentrating reflective mirrors are mainly classified into a trough parabolic reflective mirror, a curved parabolic reflective mirror, a curved and spherical reflective mirror, and so on.

In solar energy light concentrating applications, the requirements on optical properties of a reflective mirror are usually lower than those on a general optical lens. Therefore, a conventional mirror surface grinding method is not used in manufacturing of a solar energy reflective mirror surface, so as to reduce the manufacturing cost.

For an existing curved mirror, a manual gluing method is usually adopted to stick multiple small and thin glass lenses to a large sheet of curved glass. For this kind of curved mirror manufactured by distributing the small and thin glass pieces on a curved mirror of an adhesive structure, the mirror surface has poor light concentrating performance and low mirror surface reflection precision, and mostly air bubbles exist between the small and thin glass pieces and the glue. Therefore, weather resistance and corrosion resistance performance are also poor, which affect the service life. In addition, to manufacture a curved mirror of this structure, first, a large and thin glass mirror needs to be cut into multiple small pieces, and then the small glass pieces are stuck to a large sheet of curved glass, which involves a large number of complicated procedures, requires much labor and time, and makes manual operations heavy and cumbersome, thereby directly leading to low product output and a high manufacturing cost and making the curved mirror unsuitable for large-scale serialized production. In addition, if the glue is not uniformly applied, a surface appearance of the reflective mirror may be bad and the refection precision may become low, so that a high concentration ratio cannot be achieved and the product quality cannot be ensured.

In a general situation, a curved reflective mirror is obtained by deforming a flat mirror or flat glass. Two types of formation processes exist for the curved reflective mirror, one is a high-temperature thermal deformation manufacturing method, and the other is a mechanical cold deformation manufacturing method.

In the high-temperature thermal deformation manufacturing method, glass is first heated to a softening state and is then shaped in a mold. For a formed glass blank, a reflecting layer is coated thereon, and a protective layer is sprayed thereon. The manufacturing cost of this process is quite high.

In the mechanical cold deformation manufacturing method, a flat glass mirror is closely pressed against a curved surface mirror holder in a mechanical crushing manner, so that the glass mirror is mechanically deformed according to a curved surface shape of the mirror holder, and the mirror and the mirror holder are fixed through an adhesive or in a mechanical manner to form a curved reflective mirror. For a curved surface of a curved reflective mirror, the manufacturing cost required in this manner is lower than that required through the high-temperature deformation method, but the mirror holder and the curved reflective mirror have inconsistent temperature expansion coefficients. In addition, for the curved reflective mirror manufactured through this mechanical cold deformation manufacturing method, since an adhesive or a mechanical manner is used for fixing the mirror and the mirror holder, a protective paint on the back of the mirror is exposed to air. If this kind of reflective mirror is used outdoors for a long time, a reflecting layer may corrode, which shortens the service life of the reflective mirror.

In a Chinese Patent Application with the patent number 200810105690.1 and entitled "Curved Reflective Mirror Having High Mirror Surface Reflection and Manufacturing Method Thereof", curved glass formed by using a layer of curved glass and a layer of flat and thin glass mirror is disclosed. However, the curved glass used in the solution is still obtained by using a hot bending technology, and the cost is high.

In a Chinese Patent Application with the patent number 200910302460.9 and entitled "Method for Manufacturing Curved Reflective Mirror Used for Solar Heliostat", a method for manufacturing a curved reflective mirror is disclosed. In this patent application, each reflective mirror is formed of a flat reflective mirror and a mirror holder that are fixed through high-temperature heating. However, since the mirror holder and the curved reflective mirror have inconsistent expansion coefficients, the mirror holder and the curved reflective mirror contract inconsistently after being cooled, so that the solidification effect is weakened, and an adhesive failure phenomenon may occur in an application process of the reflective mirror. In addition, in a procedure of manufacturing the curved reflective mirror, this method involves a high vacuum pressure, so the structure of the mirror holder requires high strength; otherwise, the precision of a curved surface is affected. Since each reflective mirror demands a mirror holder of high strength and high precision, it is unfavorable for large-scale production and control of the cost.

SUMMARY

The present invention provides a curved reflective mirror capable of solving the above problems and a manufacturing method thereof.

In a first aspect, the present invention provides a curved reflective mirror. The curved reflective mirror includes a flat glass structure, an intermediate adhesive layer, and a flat glass mirror. The intermediate adhesive layer is positioned between the flat glass structure and the flat glass mirror, so that the flat glass structure, the intermediate adhesive layer, and the flat glass mirror are curved and deformed in a mechanical manner with the support of a mold, and then the curved and deformed flat glass structure, intermediate adhesive layer, and flat glass mirror are solidified and bonded together in a heating and/or ultraviolet (UV) light radiation and/or room temperature solidification manner to form a composite curved surface structure.

Further, the UV light radiation manner is a UV lamp radiation manner or an outdoor sunshine radiation manner.

Further, the intermediate adhesive layer includes a reinforcement shaper.

Further, the intermediate adhesive layer is a hot melt glue sheet, and preferably, the hot melt glue sheet is ethylene-vinyl acetate copolymer (EVA) or polyvinyl butyral (PVB).

Further, the intermediate adhesive layer includes a hot melt glue sheet and a reinforcement shaper, and the hot melt glue sheet is positioned on the reinforcement shaper.

Further, the intermediate adhesive layer includes liquid light solidification glue and a reinforcement shaper, and the liquid light solidification glue is coated on the reinforcement shaper. Preferably, the liquid light solidification glue is a UV binder.

Further, the intermediate adhesive layer is an adhesive layer formed of polyvinyl chloride (PVC) and an ordinary chemical adhesive.

Further, the intermediate adhesive layer includes an ordinary chemical adhesive and a reinforcement shaper, and the chemical adhesive is coated on the reinforcement shaper.

Further, the ordinary chemical adhesive is a single-component, two-component, or multi-component adhesive, and is solidified through heating or in a natural manner.

Further, the flat glass structure is toughened glass, and the flat glass mirror is a toughened glass mirror. The flat glass structure is 2 millimeters to 5 millimeters thick, and the flat glass mirror is 0.5 millimeters to 3.2 millimeters thick. Preferably, the flat glass structure is 3 millimeters thick, and the flat glass mirror is preferably 2 millimeters thick.

Further, the flat glass structure is non-toughened glass, and the flat glass mirror is a non-toughened glass mirror.

Further, the intermediate adhesive layer is 0.1 millimeters to 2 millimeters thick.

Further, an end edge of the curved reflective mirror or the entire curved reflective mirror is placed on a mirror holder, and the mirror holder is used for fixing the curved reflective mirror, so as to ensure the molding precision of the curved reflective mirror.

Further, the curved reflective mirror is a concave mirror or a convex mirror.

Further, the flat glass structure is multi-layer flat glass, and the multiple layers of the flat glass are molded and fixed through a continuous adhesive layer of a large size.

Further, the flat glass structure is two-layer flat glass, the first flat glass is close to the flat glass mirror, and the second flat glass arranged at the bottom is greater than the first flat glass in size.

Further, the flat glass mirror and the first flat glass are arranged on the second flat glass in a misaligned manner along an axial direction, so as to form a curved reflective mirror of a large size.

Further, the second flat glass, the first flat glass, and the flat glass mirror are consistent in size, and are arranged in a staggered manner along the axial direction and are molded through solidification.

In a second aspect, the present invention provides a method for manufacturing a curved reflective mirror. In the method, a flat glass mirror, an intermediate adhesive layer, and flat glass are first arranged in sequence on a curved surface supporting apparatus, and are then curved and deformed in a mechanical manner with the support of a mold. Next, the curved and deformed flat glass structure, intermediate adhesive layer, and flat glass mirror are solidified and pressed together in a heating and/or UV light radiation and/or room temperature solidification manner to form a composite curved reflective mirror.

Further, before the solidification and pressing step, the method further includes a step of preliminarily pressing the flat glass mirror and the flat glass onto the curved surface supporting apparatus by using the elasticity of the flat glass mirror.

Further, the curved surface supporting apparatus includes a base and a curved surface supporting member. The curvature of the curved surface supporting member is greater than that of the demanded curved reflective mirror, that is, the radius of curvature of the curved surface supporting member is less than that of the demanded curved reflective mirror, so as to compensate for a recurrent magnitude of the finished curved reflective mirror, and modifications of the curvature at positions on a curve are different.

Further, after the solidification and pressing step, the device formed after the solidification and pressing is trimmed and detected, and the trimmed and detected curved reflective mirror is fixed to a mirror holder.

Further, the mechanical manner is to vacuumize the mold, or to impose pressure on the flat glass structure, the intermediate adhesive layer, and the flat glass mirror in the mold.

Compared with the prior art, the present invention has the following advantages.

(1) The flat glass structure and the flat glass mirror are adopted for the formation, and a hot bending technology is not demanded. With completely consistent thermal expansion coefficients, the structure is stable, and the flat glass structure and the flat glass mirror are closely and uniformly combined. A mirror surface has excellent light concentrating performance and high reflection precision, thereby minimizing diffuse reflection, and obtaining a mirror surface reflective mirror having a specified curvature.

(2) The reinforcement shaper is fixed in the middle of a two-layer flat glass structure, which reduces the liquidity of a glue layer, reduces a recurrent magnitude of the flat glass structure, ensures the thickness of the intermediate adhesive layer and makes it easier to control the manufacturing precision of the curved reflective mirror. The reinforcement shaper sustains a curved reflective mirror, thereby enhancing the mechanical performance and reducing a damage rate. That is, when the curved reflective mirror is broken, the reinforcement shaper glues glass fragments, thereby reducing the harm to an operator and the adjacent surface of the curved reflective mirror.

(3) The flat glass structure is used as a support member of the curved reflective mirror, so that the cost is much lower than that of hot bent curved glass, large-scale serialized production is facilitated, and the quality and precision of produced products are high.

(4) A metal reflecting layer of the reflective mirror is completely sealed, and air is blocked, so that the reflective mirror has excellent weather resistance performance, does not corrode easily, and can be used in various complicated outdoor environments for a long time.

(5) The end edge of the curved reflective mirror or the entire curved reflective mirror is placed on the mirror holder. Since the mirror holder has the curvature and the size of the demanded curved reflective mirror, the mirror holder can provide more guarantees of the mechanical strength and precision for the curved reflective mirror, thereby prolonging the service life of the curved reflective mirror.

(6) The reflective mirror has a stable structure, can be permanently used without deformation, is convenient to install, and can be widely applied in various fields of solar thermal collection and concentration and solar thermal power generation.

BRIEF DESCRIPTION OF THE DRAWINGS

Specific implementation solutions of the present invention are illustrated below in more details with reference to the accompanying drawings. In the accompanying drawings.

DETAILED DESCRIPTION

Figure 1:
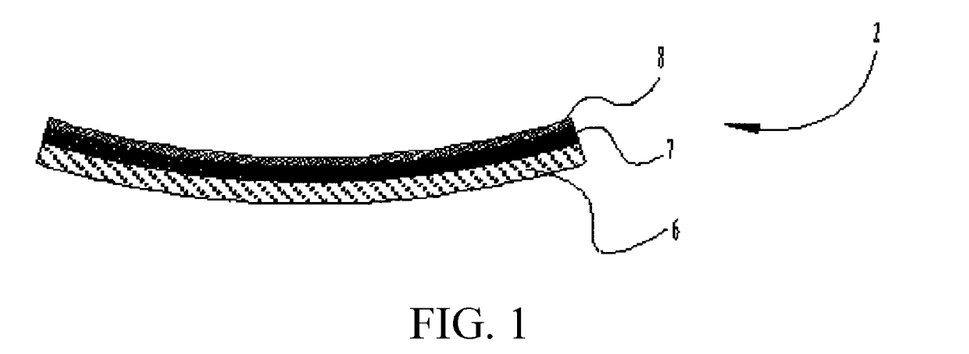
FIG. 1 is a cross-sectional view of a curved reflective mirror according to an embodiment of the present invention.

FIG. 1 is a cross-sectional view of a curved reflective mirror according to an embodiment of the present invention. In FIG. 1, the curved reflective mirror 2 is a curved reflective mirror of a composite structure formed through solidification and shaping of flat glass 6, an intermediate adhesive layer 7, and a flat glass mirror 8.

Specifically, a high-quality float flat glass mirror body can be selected and used as the flat glass mirror 8, and toughened glass with the thickness being 2 mm is preferred. Preferably, the flat glass 6 is 3 mm thick. A high-quality EVA sheet and a PVB sheet can be selected for the intermediate adhesive layer 7; or an adhesive layer formed of a high-quality EVA sheet, a PVB sheet, and a reinforcement shaper may also be selected and used as the intermediate adhesive layer 7; or an adhesive layer formed of liquid light solidification glue and a reinforcement shaper may also be adopted for the intermediate adhesive layer 7, for example, the liquid light solidification glue is a UV binder; or an adhesive layer formed of a plastic thin film such as PVC, and an ordinary chemical adhesive is selected and used as the intermediate adhesive layer 7; or an adhesive layer formed of an ordinary chemical adhesive and a reinforcement shaper is selected and used as the intermediate adhesive layer 7; or an ordinary chemical adhesive is directly selected and used as the intermediate adhesive layer 7, where the ordinary chemical adhesive may be a single-component, two-component, or multi-component adhesive.

In an embodiment of the present invention, the flat glass 6 and the flat glass mirror 8 are non-toughened glass. Preferably, the intermediate adhesive layer is 0.1 millimeters to 2 millimeters thick. Preferably, non-toughened ordinary glass with a non-ground edge is adopted to prepare a curved reflective mirror structure. By adopting the non-toughened glass, the edge grinding difficulty in the processing before toughening is reduced. In addition, by adopting the non-toughened glass, the cost is low and no pollution is caused to the environment. By adopting the non-toughened glass, the curved reflective mirror can be better molded, which ensures higher precision and a lighter curved reflective mirror.

It should be particularly noted that, since the curved reflective mirror of this embodiment is formed through pressing by adopting a two-layer glass flat structure, the finished curved reflective mirror has a certain recurrent magnitude. To solve this problem, the following manners can be adopted:

(1) The finished curved reflective mirror needs to be greater than a demanded curved reflective mirror in aspects of the curvature and size, so as to compensate for the recurrent magnitude of the molded curved reflective mirror.

(2) The intermediate adhesive layer adopts the reinforcement shaper as a support structure of a glue layer, so that the flat glass, the flat glass mirror, and the intermediate adhesive layer have consistent parameters, and the curved reflective mirror has good thermal stability in a working procedure. The reinforcement shaper also enhances an adhesion and support effect between the flat glass and the intermediate adhesive layer and between the flat glass mirror and the intermediate adhesive layer, and enhances the capability of resisting spring-back deformation of the flat glass and the flat glass mirror, thereby reducing the recurrent magnitude of the finished curved reflective mirror, improving the stability of the curved reflective mirror, and prolonging the service life of the product.

In this embodiment, the reinforcement shaper is preferably fixed between two layers of flat glass. Because of an absorption property of the reinforcement shaper, the reinforcement shaper can reduce the fluidity of a glue layer, thereby ensuring the uniformity of the glue layer. In a conventional molding procedure of flat glass, flat composite glass glue can be uniformly distributed between two layers of glass. However, if the processing is curved surface formation processing, due to the fluidity of glue, the glue cannot be uniformly distributed in an ordinary manner. Therefore, in this embodiment, the reinforcement shaper is added in the intermediate adhesive layer to absorb the glue, so that the glue is uniformly distributed between the two layers of glass, thereby achieving the objective of uniformly distributing the glue. Because the reinforcement shaper is arranged between the two layers of flat glass, the two layers of flat glass and the glue can form a whole body after the molding, which further enhances the adhesion and support effect, improves the capability of resisting spring-back of the flat glass and the flat glass mirror, and reduces the recurrent magnitude of the finished curved reflective mirror.

In the procedure of manufacturing the curved reflective mirror, the curvature of the curved reflective mirror is directly related to the thicknesses of a curved surface supporting apparatus, the flat glass, the intermediate adhesive layer, and the flat glass mirror. Therefore, it is extremely important to ensure the thickness of the intermediate adhesive layer. The reinforcement shaper can effectively control the thickness of the intermediate adhesive layer, so as to conveniently control the manufacturing precision of the curved reflective mirror. In addition, the reinforcement shaper may also sustain the flat reflective mirror and enhance the mechanical performance of the curved reflective mirror. Moreover, the reinforcement shaper is arranged between the two flat layers, which reduces a product damage rate. When the curved reflective mirror is broken, the reinforcement shaper may glue glass fragments, thereby reducing the harm to an operator and the adjacent surface of the curved reflective mirror.

Figure 2:
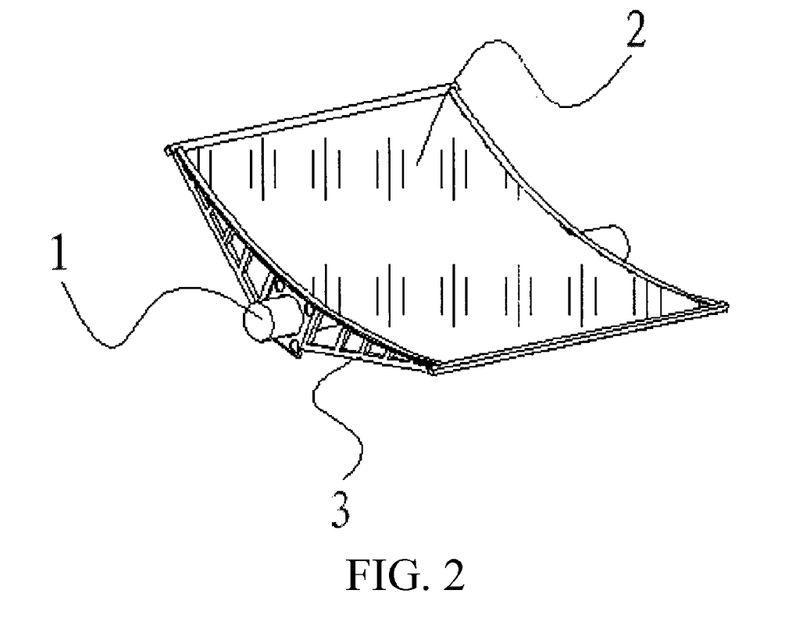
FIG. 2 is a schematic three-dimensional view of a reflective mirror integral structure according to an embodiment of the present invention.

FIG. 2 is a schematic three-dimensional view of a reflective mirror integral structure according to an embodiment of the present invention. To further ensure the molding precision of a curved reflective mirror 2, the curved reflective mirror 2 is fixed inside a mirror holder 1, thereby forming a reflective mirror integral structure.

In FIG. 2, the reflective mirror integral structure includes the mirror holder 1, the curved reflective mirror 2 (a specific structure thereof can be obtained with reference to FIG. 1), and a curved surface support frame 3. A surface, close to the curved reflective mirror 2, of the mirror holder 1 is a curved surface, and the curvature and the size of the curved surface are consistent with those of a back curved surface of the demanded curved reflective mirror 2. In addition, an end edge of the curved reflective mirror 2 or the entire curved reflective mirror 2 is placed on the mirror holder 1, and is supported and fixed by the curved surface support frame 3. Since the mirror holder has the curvature and the size same as those of the demanded curved reflective mirror, and can support and fix the curved reflective mirror, the mirror holder can provide higher mechanical strength for the curved reflective mirror and prolong the service life of the curved reflective mirror.

Figure 3:
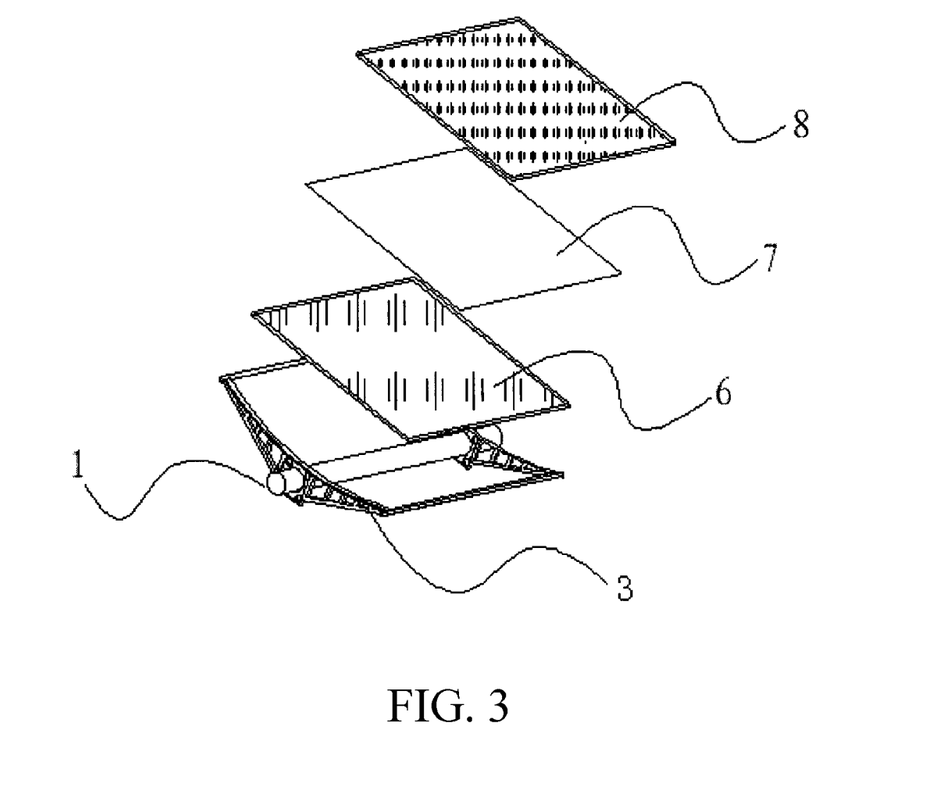
FIG. 3 is a schematic decomposed view of materials required for a curved reflective mirror according to an embodiment of the present invention.

FIG. 3 is a schematic decomposed view of materials required for a curved reflective mirror according to an embodiment of the present invention. A curved reflective mirror with an opening (a straight line distance between two endpoints of an arc) being 1.2 m, the length being 2.4 m, and the arc length being 1.22 m is currently taken as an example to illustrate FIG. 3 in detail.

In FIG. 3, materials required for the curved reflective mirror are respectively curved surface support frames 3, a mirror holder 1, flat glass 6, an intermediate adhesive layer 7, and a flat glass mirror 8.

The curvature and the size of the curved surface support frame 3 are consistent with those of the back of the curved reflective mirror 2. An opening of the curved surface support frame 3 is slightly greater than that of the curved reflective mirror, that is, the opening of the curved surface support frame 3 is slightly greater than 1.2 m, and a center distance between two adjacent curved surface support frames is 2.4 m.

The flat glass 6 is 1.22 m long, 2.4 m wide, and 3 mm thick; and the material of the flat glass 6 is toughened glass.

The intermediate adhesive layer 7 may be a hot melt glue sheet, and high quality EVA and PVB with good weather resistance are adopted therefor. The size of the hot melt glue sheet is slightly greater than that of the flat glass 6, for example, the size of the hot melt glue sheet is 1.25 m×2.5 m.

The intermediate adhesive layer 7 may also be a hot melt glue sheet and a reinforcement shaper, and the hot melt glue sheet is arranged on the reinforcement shaper. The size of the reinforcement shaper is slightly greater than that of the flat glass 6, for example, the size of the reinforcement shaper is 1.25 m×2.5 m, and the material of the reinforcement shaper is glass fiber fabric or non-woven fabric.

For the intermediate adhesive layer 7, liquid light solidification glue (for example, a liquid UV binder) is coated on the reinforcement shaper to form the intermediate adhesive layer. The size of the reinforcement shaper is greater than that of the flat glass 6, for example, the size of the reinforcement shaper is 1.25 m×2.5 m.

The intermediate adhesive layer 7 may also adopt an ordinary chemical adhesive, and the ordinary chemical adhesive is a single-component, two-component, or multi-component adhesive. In addition, the intermediate adhesive layer 7 may also be an ordinary chemical adhesive and a reinforcement shaper, so that the flat glass mirror 8 and the flat glass 6 are completely bonded and merged, and are closely and uniformly combined into a whole. The intermediate adhesive layer adopting an ordinary chemical adhesive is low in cost, simple to operate, but has a suboptimal effect.

The size and thickness of the flat glass mirror 8 are slightly less than those of the flat glass 6, for example, the size of the flat glass mirror 8 is 1.2 m×2.4 m, and the thickness thereof is 2 mm.

In FIG. 3, a curved surface of the mirror holder 1 faces upwards, and a mirror surface (a surface coated with a reflecting layer) of the flat glass mirror 8 faces downwards and closely adjoins the intermediate adhesive layer 7. This manner of placing the reflective surface coated with the reflecting layer in the inside greatly reduces wear and damage to the coating.

The flat glass in FIG. 1 to FIG. 3 is of a one-layer flat glass structure. Actually, the flat glass is not limited to the one-layer flat glass structure, and the flat glass may also be a multi-layer flat glass structure. In the following FIG. 4, that the flat glass structure is two-layer flat glass is taken as an example to illustrate the multi-layer flat glass structure in detail.

Figure 4:
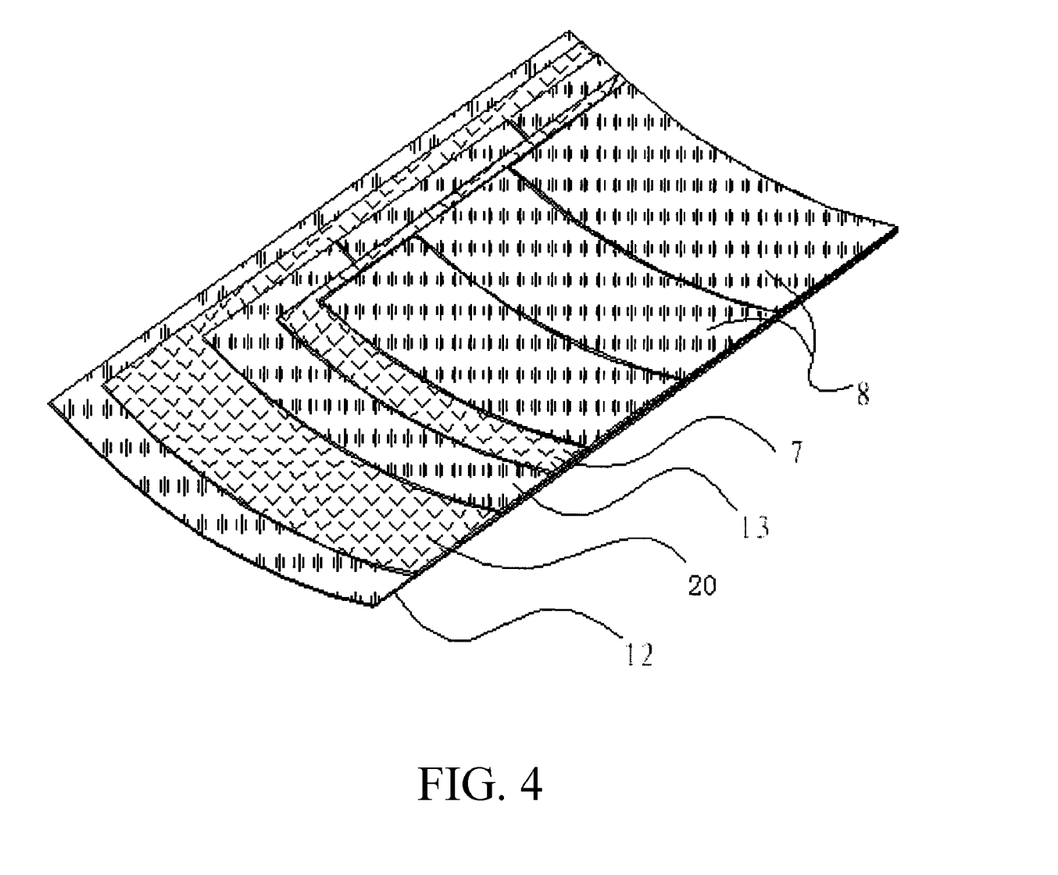
FIG. 4 is a schematic three-dimensional structural view of a curved reflective mirror according to another embodiment of the present invention.

FIG. 4 is a schematic three-dimensional structural view of a curved reflective mirror according to another embodiment of the present invention. The curved reflective mirror includes a flat glass mirror 8, an intermediate adhesive layer 7, and a flat glass structure. The flat glass structure includes first flat glass 13, an adhesive layer 20, and second flat glass 12.

It should be noted that, the flat glass structure is not limited to a two-layer structure shown in FIG. 4. That is, the present invention is not limited to that only the first flat glass 13 and the second flat glass 12 are included, and the flat glass structure may also include multiple layers of flat glass, so as to form a multi-layer flat glass structure.

In FIG. 4, the flat glass structure is obtained by fixing the two layers of flat glass (that is, the first flat glass 13 and the second flat glass 12) after the two layers of flat glass form a curved surface through an adhesive layer 20. The specific structure and working principle of the adhesive layer are the same as those of the above described intermediate adhesive layer 7.

In FIG. 4, the flat glass structure (including the first flat glass 13, the adhesive layer 20, and the second flat glass 12) is positioned below the flat glass mirror 8.

In an embodiment of the present invention, the two layers of flat glass have different sizes, and the size of the second flat glass 12 positioned at the bottom is greater than that of the first flat glass 13 positioned at the top. The first flat glass 13 is arranged above the second flat glass 12 in a regular manner. After being pressed and molded, the second flat glass 12 and the first flat glass 13 are solidified through a continuous adhesive layer 20 of a large size to form a curved two-layer flat glass structure. The flat glass mirror 8 similar to the first flat glass 13 in size is arranged on the two-layer flat glass structure in a misaligned manner along a longitudinal direction (that is, an axial direction), and a curved reflective mirror is formed after solidification through the continuous adhesive layer 20 of a large size.

In another embodiment (not shown in FIG. 4) of the present invention, the second flat glass 12 and the first flat glass 13 of the two-layer flat glass structure have the same size as the flat glass mirror 8. The three sheets of glass (that is, the second flat glass 12, the first flat glass 13, and the flat glass mirror 8) are arranged in a misaligned manner along the axial direction, and after being pressed and molded, layers of curved surfaces are solidified through the continuous adhesive layer 20 of a large size to form a curved reflective mirror. For the curved reflective mirror of a multi-layer flat glass structure, molding and solidification of a large-sized curved surface can be completed in the same procedure.

It can be seen that, the curved reflective mirror with a multi-layer flat glass structure has higher curved surface precision, and thinner single-sheet flat glass and a flat glass mirror can be adopted and curved to achieve higher curvature, and meanwhile, to achieve higher mechanical strength. Moreover, in a staggered arrangement and jointing manner, glass of small sizes can be combined and jointed to form a single curved mirror of a large size, thereby enlarging an application range.

In addition, for the curved reflective mirror having multiple layers of flat glass, molding and solidification of a curved surface are completed in the same procedure.

Figure 5:
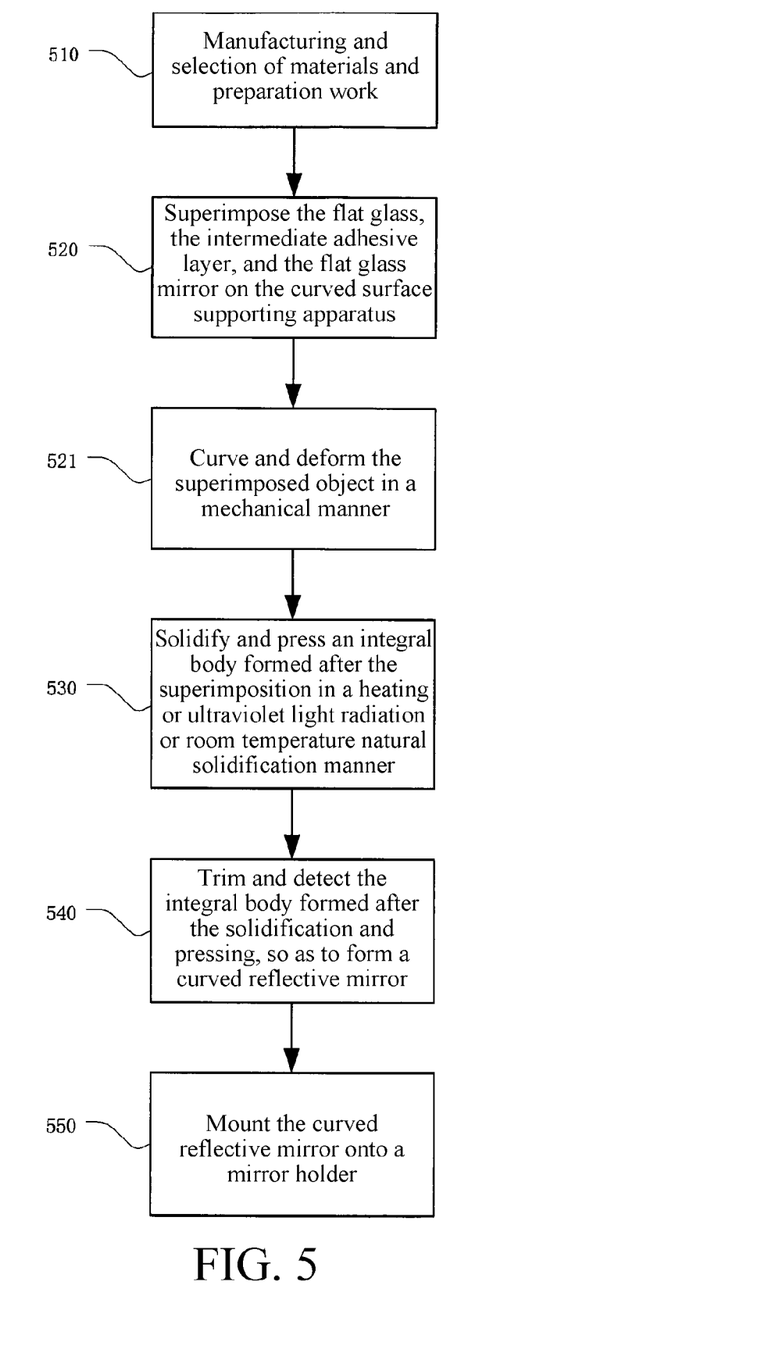
FIG. 5 is a flow chart of a manufacturing process of a reflective mirror integral structure according to an embodiment of the present invention.

FIG. 5 is a flow chart of a manufacturing process of a reflective mirror integral structure according to an embodiment of the present invention.

In Step 510, manufacturing and selection of materials and corresponding preparation work are performed, including manufacturing of a curved surface supporting apparatus, selection and preparation of flat glass 6, an intermediate adhesive layer 7, and a flat glass mirror 8.

It should be noted that, the curved surface supporting apparatus is an apparatus used for holding, fixing, and manufacturing a curved reflective mirror in a procedure of forming the curved reflective mirror. The above described curved surface support frame 3 is an apparatus used for fixing and supporting the reflective mirror after the curved reflective mirror is molded and during a working process of the curved reflective mirror.

Figure 6:
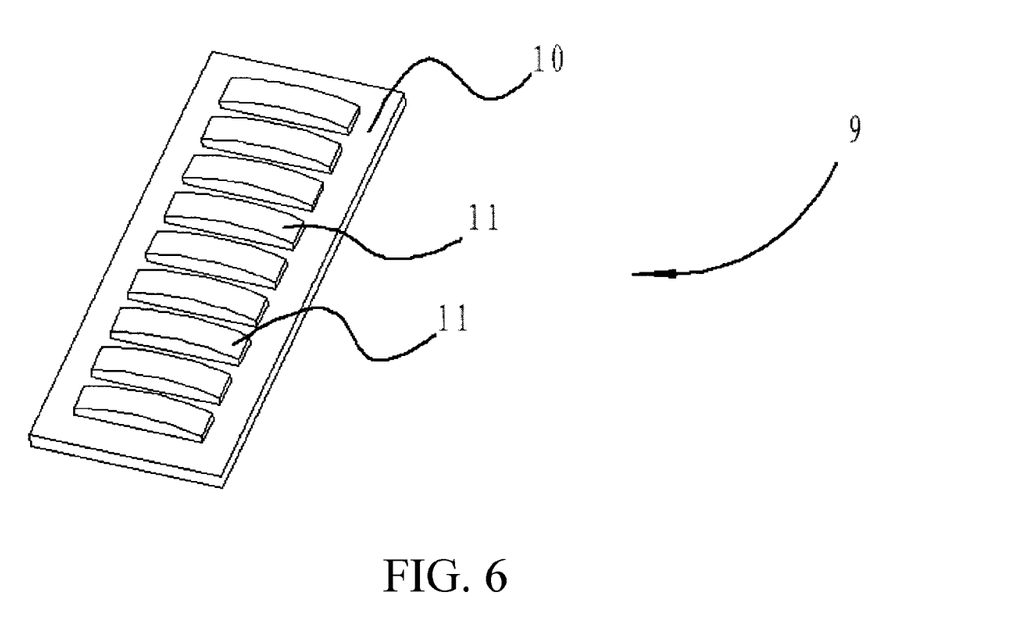
FIG. 6 is a schematic structural view of a curved surface supporting apparatus according to an embodiment of the present invention.

The shape, working principle, and manufacturing manner of the curved surface supporting apparatus are described in detail through FIG. 6 and an illustrative part corresponding thereto. In a procedure of manufacturing the reflective mirror integral structure, the selection and manufacturing of the materials further include selection and manufacturing of the flat glass, the intermediate adhesive layer, and the flat glass mirror, which are illustrated below in detail.

Toughened and smooth flat glass being 2 mm to 5 mm thick can be selected and used as the flat glass 6, and preferably, the thickness is 3 mm. For a material of the intermediate adhesive layer 7, a hot melt glue sheet, or a hot melt glue sheet and a reinforcement shaper, or liquid light solidification glue (for example, a UV binder) and a reinforcement shaper, or an ordinary chemical adhesive, or an ordinary chemical adhesive and a reinforcement shaper can be selected and used.

When the intermediate adhesive layer 7 is a hot melt glue sheet, the intermediate adhesive layer may be EVA, and the fusion temperature of the intermediate adhesive layer ranges from 120° C. to 140° C. When a hot melt glue sheet and a reinforcement shaper are selected and used as the material of the intermediate adhesive layer 7, the reinforcement shaper needs to be arranged below the hot melt glue sheet.

When the materials selected for the intermediate adhesive layer 7 are liquid light solidification glue (for example, a UV binder) and a reinforcement shaper, the liquid light solidification glue (for example, a UV binder) needs to be uniformly coated on the reinforcement shaper.

When the material selected for the intermediate adhesive layer 7 is an ordinary chemical adhesive, two methods exist for molding the curved reflective mirror. In one method, a layer of plastic thin film, for example, PVC, is adhered to the back (a coated surface) of the flat reflective mirror 8 through heating or cold pressing, and another layer of PVC is adhered to a surface of the flat glass 6 ready for adhesion; and then the two layers of PVC are solidified through the ordinary chemical glue, and the curved reflective mirror is formed after the glue dries. In another method, the ordinary chemical adhesive is directly coated on two sides of the two sheets of flat glass (the flat reflective mirror 8 and the flat reflective glass 6) to be coated, the two sheets of flat glass are then curved and pressed together, and after the ordinary chemical adhesive is solidified, a curved reflective mirror is formed.

A high-quality coated smooth flat float glass mirror at a mirror manufacturing level may be selected and used as the flat glass mirror 8, the material is toughened glass, and the thickness is from 0.5 mm to 3.2 mm, preferably, 2 mm. The size of the flat glass mirror 8 needs to be slightly less than that of the flat glass 6.

In Step 520, the flat glass 6, the intermediate adhesive layer 7, the flat glass mirror 8, and the curved surface supporting apparatus are superimposed.

Specifically, the flat glass mirror 8, the intermediate adhesive layer 7, and the flat glass 6 are arranged in sequence on the curved surface supporting apparatus, so that the four form a successively superimposed layered shape from bottom to top. Next, preliminary pressing and fixing are performed by using the elasticity of the flat glass mirror 8, so that the flat glass 6 and the flat glass mirror 8 are closely pressed and arranged according to a convex surface (or a concave surface) of the curved surface supporting apparatus, and the external size of the intermediate adhesive layer 7 is slightly greater than the size of the flat glass 6.

In Step 521, the preliminarily pressed and fixed flat glass mirror, intermediate adhesive layer, and flat glass are curved and deformed in a mechanical manner. In one mechanical manner, the curved surface supporting apparatus is vacuumized, and the flat glass mirror, the intermediate adhesive layer, and the flat glass are bent and deformed under the effect of atmospheric pressure. In another mechanical manner, pressure is directly imposed on the flat glass mirror, the intermediate adhesive layer, and the flat glass to curve and deform the flat glass mirror, the intermediate adhesive layer, and the flat glass. In Step 530, the superimposed flat glass 6, intermediate adhesive layer 7, and flat glass mirror 8 are solidified and pressed together in a heating or UV light radiation or room temperature natural solidification manner.

Specifically, when the intermediate adhesive layer 7 is a hot melt glue sheet, a high pressure and temperature raising manner is adopted, so that the intermediate adhesive layer 7, the flat glass mirror 8, and the flat glass 6 are completely bonded, and are closely and uniformly combined into a whole. Process parameters of the hot melt glue sheet are as follows: (1) the temperature and the pressure are simultaneously raised; (2) preliminary heating is performed to raise the temperature from 20° C. to 50° C., and the time for heating is 20 minutes; (3) the heating temperature is raised from 50° C. to 120° C., and the time for heating is 1 hour; (4) the temperature in a glue bag is lowered to 50° C.; and (5) a vacuum degree is maintained lower than 10000 Pa in the entire heating procedure.

When the intermediate adhesive layer 7 is formed of liquid light solidification glue (for example, a UV binder) and a reinforcement shaper, the intermediate adhesive layer 7 is solidified in a UV lamp radiation or outdoor sunshine radiation manner with preliminarily solidification completed within 1 to 5 minutes and the adhesion completed within 20 to 100 minutes. In a procedure of UV lamp or sunshine radiation, the vacuum degree is lower than 10000 Pa. In addition, when sunshine radiation is adopted to complete solidification for the curved reflective mirror, the entire process is energy saving and highly efficient.

When the intermediate adhesive layer 7 is formed of a plastic thin film such as PVC, and an ordinary chemical glue, a low temperature or room temperature natural solidification manner is adopted, so that the intermediate adhesive layer 7, the flat glass mirror 8, and the flat glass 6 are completely bonded and merged, and are closely and uniformly combined into a whole.

When the intermediate adhesive layer 7 is an ordinary adhesive, a low temperature or room temperature natural solidification manner is directly adopted, so that the intermediate adhesive layer 7, the flat glass mirror 8, and the flat glass 6 are completely bonded and merged, and are closely and uniformly combined into a whole.

When the intermediate adhesive layer 7 is formed of an ordinary chemical glue and a reinforcement shaper, a low temperature or room temperature natural solidification manner is directly adopted, so that the intermediate adhesive layer 7, the flat glass mirror 8, and the flat glass 6 are completely bonded and merged, and are closely and uniformly combined into a whole.

It should be noted that, for the curved reflective mirror, a mechanical manner may also be adopted to press the flat glass and the flat glass mirror together to form a curved surface, and the intermediate adhesive layer arranged between the two flat mirrors is then solidified along with the curved surface, so that the flat glass, the flat glass mirror, and the intermediate adhesive layer form a new integral curved surface. Since the intermediate adhesive layer between the two flat mirrors prevents the curved reflective mirror from restoring to a flat state, a demanded curved surface structure is maintained.

In Step 540, the integral body formed by solidifying and pressing together the flat glass 6, the intermediate adhesive layer 7, and the flat glass mirror 8 is trimmed and detected to form the curved reflective mirror 2.

Specifically, extra peripheral margins of the intermediate adhesive layer 7 are first cut off, and then it is checked whether problems, such as a bubble, an impurity, a breakage, and a glue failure, exist in the integral body, and corresponding repair is carried out based on a check result, so as to form a curved reflective mirror of high quality.

In Step 550, the formed curved reflective mirror is mounted on a mirror holder 1.

Specifically, the curved reflective mirror 2 is fixed on the mirror holder 1 by using a T-shaped compressing member and an L-shaped compressing member, so as to maintain good strength and facilitate the mounting in another system.

FIG. 6 is a schematic structural view of a curved surface supporting apparatus according to an embodiment of the present invention. The curved surface supporting apparatus 9 is formed of a base 10 and multiple evenly spaced curved surface supporting members 11. Therefore, a procedure of manufacturing the curved surface supporting apparatus 9 is a procedure of manufacturing the base 10 and the curved surface supporting members 11 and mounting the curved surface supporting members 11 onto the base 10.

The curved surface supporting apparatus 9 is used for supporting flat glass 6 and a flat glass mirror 8 in a processing procedure of the curved reflective mirror 2, so that the flat glass 6 and the flat glass mirror 8 are fixed and molded into a curved shape. Therefore, the curvature and the size of a curved surface of the curved surface supporting member 11 are approximate to those of a back portion of the curved reflective mirror 2. If a recurrent magnitude of the finished curved reflective mirror is considered, the curvature of the curved surface of the curved surface supporting member 11 is required to be slightly greater than the curvature of the demanded curved reflective mirror 2, and a radius of curvature thereof is required to be slightly less than that of the demanded curved reflective mirror 2, so as to compensate for the recurrent magnitude of the finished curved reflective mirror 2.

In addition, to further overcome and reduce the recurrent magnitude of the curved reflective mirror 2, in a selecting procedure of the intermediate adhesive layer 7, a reinforcement shaper is selected and used as a supporting structure of a glue layer, so that the flat glass, the flat glass mirror, the reinforcement shaper, and the intermediate adhesive layer have consistent parameters, thereby ensuring that the curved reflective mirror has good thermal stability in a working procedure. Moreover, the reinforcement shaper further strengthens an adhesion and support effect between the flat glass and the intermediate adhesive layer and between the flat glass mirror and the intermediate adhesive layer, thereby improving the stability of the curved reflective mirror and prolonging the service life of the product.

The applicant points out in particular that the curved reflective mirror structure of the present invention may be a concave surface structure, for example, a parabolic surface type, a cylindrical surface type, or a composite parabolic surface type, and may also be a convex surface structure, and the present invention can be applied in multiple fields, such as the fields of a solar photovoltaic system and a solar thermal system.

Apparently, many modifications can be made to the present invention described herein without departing from the actual spirit and scope of the present invention. Therefore, all modifications obvious to those skilled in the art should fall within the scope of the claims. The protection scope of the present invention is only defined by the claims.

What is claimed is:

1. A curved reflective mirror, comprising a flat glass structure, an intermediate adhesive layer, and a flat glass mirror,
   wherein the intermediate adhesive layer is positioned between the flat glass structure and the flat glass mirror, so that the flat glass structure, the intermediate adhesive layer, and the flat glass mirror are curved and deformed in a mechanical manner with support of a mold, and the curved and deformed flat glass structure, intermediate adhesive layer, and flat glass mirror are solidified and bonded together in a heating and/or ultraviolet (UV) light radiation and/or room temperature solidification manner to form a composite curved surface structure,
   wherein the intermediate adhesive layer comprises an adhesive and a reinforcement shaper, and
   wherein the reinforcement shaper reduces liquidity of the adhesive, and causes the adhesive to be uniformly distributed between the flat glass structure and the flat glass mirror.

2. The curved reflective mirror according to claim 1, wherein the UV light radiation manner is a UV lamp radiation or outdoor sunshine radiation manner.

3. The curved reflective mirror according to claim 1, wherein the intermediate adhesive layer is a hot melt glue sheet.

4. The curved reflective mirror according to claim 3, wherein the hot melt glue sheet is ethylene-vinyl acetate copolymer (EVA) or polyvinyl butyral (PVB).

5. The curved reflective mirror according to claim 1, wherein the intermediate adhesive layer comprises a hot melt glue sheet and the reinforcement shaper, and the hot melt glue sheet is positioned on the reinforcement shaper.

6. The curved reflective mirror according to claim 1, wherein the intermediate adhesive layer comprises liquid light solidification glue and the reinforcement shaper, and the liquid light solidification glue is coated on the reinforcement shaper.

7. The curved reflective mirror according to claim 6, wherein the liquid light solidification glue is a UV binder.

8. The curved reflective mirror according to claim 1, wherein the intermediate adhesive layer comprises an ordinary chemical adhesive.

9. The curved reflective mirror according to claim 8, wherein the ordinary chemical adhesive is a single-component, two-component, or multi-component adhesive.

10. The curved reflective mirror according to claim 1, wherein the intermediate adhesive layer comprises an ordinary chemical adhesive and the reinforcement shaper, and the chemical adhesive is coated on the reinforcement shaper.

11. The curved reflective mirror according to claim 1, wherein the reinforcement shaper is glass fiber fabric or non-woven fabric.

12. The curved reflective mirror according to claim 1, wherein an end edge of the curved reflective mirror or the entire curved reflective mirror is placed on a mirror holder and the mirror holder is used for fixing the curved reflective mirror.

13. The curved reflective mirror according to claim 1, wherein the flat glass structure is toughened glass, and the flat glass mirror is a toughened glass mirror.

14. The curved reflective mirror according to claim 1, wherein the flat glass structure is non-toughened glass, and the flat glass mirror is a non-toughened glass mirror.

15. The curved reflective mirror according to claim 14, wherein the intermediate adhesive layer is 0.1 millimeters to 2 millimeters thick.

16. The curved reflective mirror according to claim 1, wherein the flat glass structure is 2 millimeters to 5 millimeters thick, and the flat glass mirror is 0.5 millimeters to 3.2 millimeters thick.

17. The curved reflective mirror according to claim 1, wherein the curved reflective mirror is a concave mirror or a convex mirror.

18. The curved reflective mirror according to claim 1, wherein the flat glass structure is multi-layer flat glass, and the multiple layers of the flat glass are molded and fixed through a continuous adhesive layer of a large size.

19. The curved reflective mirror according to claim 1, wherein the flat glass structure is two-layer flat glass, first flat glass is close to the flat glass mirror, and second flat glass arranged at the bottom is greater than the first flat glass in size.

20. The curved reflective mirror according to claim 1, wherein the flat glass mirror and first flat glass are arranged in a misaligned manner on second flat glass along an axial direction to form a large-sized curved reflective mirror.

21. The curved reflective mirror according to claim 1, wherein second flat glass, first flat glass, and the flat glass mirror are consistent in size, and are arranged in a staggered manner along an axial direction and are molded through solidification.

22. The curved reflective mirror according to claim 1, wherein the intermediate adhesive layer comprises an adhesive layer and the reinforcement shaper in direct contact with the adhesive layer.

23. A curved reflective mirror according to claim 1, wherein the reinforcement shaper comprises a fabric support structure that supports the adhesive between the flat glass structure and the flat glass mirror.

24. A method of manufacturing a curved reflective mirror, comprising:
arranging a flat glass mirror, an intermediate adhesive layer, and a flat glass structure in sequence on a curved surface supporting apparatus, wherein the intermediate adhesive layer comprises an adhesive and a reinforcement shaper;
curving and deforming the flat glass mirror, the intermediate adhesive layer, and the flat glass structure in a mechanical manner with the support of a mold; and
solidifying and pressing together the curved and deformed flat glass structure, intermediate adhesive layer, and flat glass mirror in a heating and/or ultraviolet (UV) light radiation and/or room temperature solidification manner to form a composite curved reflective mirror,
wherein the reinforcement shaper reduces liquidity of the adhesive, and causes the adhesive to be uniformly distributed between the flat glass structure and the flat glass mirror.

25. The method of manufacturing a curved reflective mirror according to claim 24, wherein before the solidification and pressing step, the method comprises a step of preliminarily pressing the flat glass mirror and the flat glass structure onto the curved surface supporting apparatus by using the elasticity of the flat glass mirror.

26. The method of manufacturing a curved reflective mirror according to claim 24, wherein before the step of arranging the flat glass mirror, the intermediate adhesive layer, and the flat glass structure in sequence on the curved surface supporting apparatus, the method comprises a step of manufacturing the curved surface supporting apparatus.

27. The method of manufacturing a curved reflective mirror according to claim 26, wherein the curved surface supporting apparatus comprises a base and a curved surface supporting member, curvature of the curved surface supporting member is greater than that of the demanded curved reflective mirror, so as to compensate for a recurrent magnitude of the finished curved reflective mirror.

28. The method of manufacturing a curved reflective mirror according to claim 24, wherein after the solidification and pressing step, the method comprises a step of trimming and detecting the composite curved reflective mirror.

29. The method of manufacturing a curved reflective mirror according to claim 28, wherein after the trimming and detecting step, the method comprises a step of fixing the formed curved reflective mirror on a mirror holder.

30. The method of manufacturing a curved reflective mirror according to claim 28, wherein the mechanical manner is to vacuumize the mold or impose pressure on the flat glass structure, the intermediate adhesive layer, and the flat glass mirror in the mold.

31. The method of manufacturing a curved reflective mirror according to claim 24, wherein the curving and deforming the flat glass mirror, the intermediate adhesive layer, and the flat glass structure is done in a cold-bend technique of less than 100 degrees C., while the adhesive is heated.

* * * * *